(12) United States Patent
Morimoto et al.

(10) Patent No.: US 6,787,610 B2
(45) Date of Patent: Sep. 7, 2004

(54) PLASMA-RESISTANT FLUORINE-BASED ELASTOMER SEALING MATERIAL

(75) Inventors: Kazuki Morimoto, Hamamatsu (JP); Mitsuyuki Nakano, Hamamatsu (JP); Kazuo Nishimoto, Yokohama (JP)

(73) Assignee: Nichias Corporation, Tokyo (JP)

( * ) Notice: Subject to any disclaimer, the term of this patent is extended or adjusted under 35 U.S.C. 154(b) by 29 days.

(21) Appl. No.: 10/267,859

(22) Filed: Oct. 10, 2002

(65) Prior Publication Data

US 2003/0114599 A1 Jun. 19, 2003

(30) Foreign Application Priority Data

Oct. 12, 2001 (JP) .................................. P. 2001-315321
Mar. 29, 2002 (JP) .................................. P. 2002-095254

(51) Int. Cl.$^7$ ........................ C08F 259/08; C08L 83/04; C08G 77/26
(52) U.S. Cl. ..................... 525/276; 525/92 G; 525/192; 525/199; 525/200; 525/215; 525/326.2; 525/326.5; 525/342; 525/478; 528/38; 528/42
(58) Field of Search .............................. 525/276, 92 G, 525/192, 199, 200, 215, 326.2, 326.5, 342, 478, 102; 528/38, 42

(56) References Cited

U.S. PATENT DOCUMENTS 5,132,366 A   7/1992   Kashida et al.
6,441,079 B2 * 8/2002   Sato et al. .................. 524/448

FOREIGN PATENT DOCUMENTS

| EP | 0 380 104 A  | 8/1990  |
| EP | 0 725 113 A1 | 8/1995  |
| EP | 1 033 387 A2 | 9/2000  |
| EP | 1 081 185 A1 | 3/2001  |
| EP | 1 114 846 A  | 7/2001  |
| EP | 1 125 973 A2 | 8/2001  |
| EP | 1 217 025 A1 | 5/2002  |
| EP | 1 223 194 A1 | 7/2002  |
| EP | 1 247 831 A2 | 10/2002 |
| JP | 2000034466   | 2/2000  |
| JP | 2001348452   | 12/2001 |

* cited by examiner

Primary Examiner—James J. Seidleck
Assistant Examiner—Olga Asinovsky
(74) Attorney, Agent, or Firm—Nixon & Vanderhye P.C.

(57) ABSTRACT

An elastomer sealing material having low dielectric constant and low dielectric dissipation, which is satisfactory with both of resistance to oxygen plasma and non-adhesion to quartz and can be applied to apparatus utilizing microwaves, is disclosed. The plasma-resistant fluorine-based elastomer sealing material comprises a fluorine-based elastomer having a divalent perfluoropolyether or divalent perfluoroalkylene structure in the main chain thereof and having two or more hydrosilyl groups and addition-reactive alkenyl groups in the terminals or side chains thereof, and a polymer having two or more hydrosilyl groups in the molecule and being capable of addition reacting with the alkenyl groups, the fluorine-based elastomer being crosslinked with the polymer.

3 Claims, No Drawings

PLASMA-RESISTANT FLUORINE-BASED ELASTOMER SEALING MATERIAL

FIELD OF THE INVENTION

The present invention relates to a sealing material comprising a fluorine-based elastomer, particularly an elastomer sealing material used for semiconductor production and semiconductor delivery apparatus, which are required to have plasma resistance, heat resistance and chemical resistance.

DESCRIPTION OF THE RELATED ART

Various plasma treatments, such as CVD (Chemical Vapor Deposition), etching or ashing, utilizing various plasma gases such as fluorocarbon-based gas plasma and oxygen plasma are conducted in the manufacture steps of semiconductor elements and liquid crystal panels, are employed. In a treatment apparatus using plasma, it is necessary to maintain the inside of a reactor in vacuo. For this purpose, elastomeric sealing materials are used for sealing various connecting sections or movable sections, such as chambers and gate valves.

Those elastomer sealing materials are required to have not only sealing properties but also plasma resistance and heat resistance capable of withstanding severe plasma processing conditions, and also have a property such that the materials do not generate particles which may contaminate semiconductors. Fluorine-based elastomers and silicone-based elastomers have conventionally been used as materials of the elastomer sealing materials that can meet those requirements.

Examples of the fluorine-based elastomers include perfluoro elastomers and fluorocarbon rubbers. Those have excellent resistance to fluorocarbon-based gas plasma but show large weight loss to oxygen plasma. On the other hand, examples of the silicone-based elastomers include silicone rubbers and fluorosilicone rubbers. Those rubbers have the characteristic that those have excellent resistance to oxygen plasma but show large weight loss to fluorocarbon-based gas plasma. Accordingly, it is the present status that a sealing material is chosen and used depending on the type of plasma. In many cases, fluorine-based elastomer sealing materials are used in plasma etching apparatus using mainly a fluorocarbon-based gas, and silicone-based elastomer sealing materials are used in plasma ashing apparatus using mainly oxygen.

In addition, there is a case where a quartz-made chamber or inspection window is used in a plasma-emitting section of a semiconductor production apparatus. When a silicone-based elastomer sealing material is used in such a section, the quartz and the sealing material are firmly adhered to each other, resulting in various problems. For example, even when it is intended to open the chamber during the maintenance, the sealing material is adhered to a flange and broken, and the sealing material is obliged to be exchanged, the matter of which is not supposed originally. Further, in the case where it is intended to open the inspection window, the sealing material causes adhesion so that quartz constituting a window material may possibly be broken. Moreover, during exchanging the sealing material, the sealing material is hardly peeled off, resulting in spending time and effort on the exchange operation. Thus, while the silicone-based elastomer sealing material is suitable in the section where the resistance to oxygen plasma is required, it becomes unsuitable in the section where quartz is used because it causes adhesion.

On the other hand, the fluorine-based elastomer sealing material does not substantially involve adhesion to quartz, but has the problem on resistance to oxygen plasma.

In the semiconductor production process, microwave energies are often utilized. According to discharge utilizing microwave energies, it is possible to localize the energies in a discharge space without need of electrodes. Further, according to this method, since contamination of impurities as seen in sputtering or the like can be avoided, it has an advantage that high-density, uniform and clean plasma can be formed. Accordingly, microwaves are eagerly used in various semiconductor production apparatus including an ECR (Electron Cyclotron Resonance) plasma CVD apparatus, a reactive ion etching apparatus, an ECR plasma etching apparatus and a plasma etching apparatus.

In the above-described semiconductor production apparatuses, rubber-made O-rings are used as a sealing material of a vacuum chamber. The rubber-made O-rings are mainly composed of a fluorocarbon rubber, a silicone rubber or a perfluoro elastomer, each having excellent heat resistance. However, those rubber materials involve a problem that those absorb the microwaves and generate heat, resulting in degradation.

In general, it is known that an amount of heat generation of the material depends on sizes of a dielectric constant and a dielectric dissipation of the material and that the lower both of the dielectric constant and the dielectric dissipation, the lower the heat generation is. For this reason, the rubber materials used in the semiconductor production apparatus utilizing microwaves are required to have not only a lower dielectric constant but also a lower dielectric dissipation. However, the above-described conventional rubber materials for rubber-made O-rings have high dielectric constant and dielectric dissipation in a microwave band having a frequency of 2.45 GHz as generally used in semiconductor production apparatus, and therefore, those generate a large amount of heat and generally have short life.

Of other rubber materials, EPDM (ethylene-propylene-diene terpolymer) has both low dielectric constant and low dielectric dissipation and also shows small amount of heat generation by microwaves. However, it involves a problem that the material has poor heat resistance.

In the light of the above, it is the present status that optimum rubber materials for apparatus utilizing microwaves have not been found yet.

SUMMARY OF THE INVENTION

Under such circumstances, the present invention has been made.

Accordingly, an object of the present invention to provide an elastomer sealing material having low dielectric constant and low dielectric dissipation, which is satisfactory with both of resistance to oxygen plasma and non-adhesion to quartz, and which can be applied to apparatus utilizing microwaves.

As a result of extensive and intensive investigations to overcome the above problems, it has been found that it is effective to improve resistance to oxygen plasma of a fluorine-based elastomer sealing material that is difficult to cause adhesion to quartz in a plasma-emitting section. The present invention has been completed based on this finding.

According to the present invention, a plasma-resistant fluorine-based elastomer sealing material is provided, which comprises a fluorine-based elastomer having a divalent perfluoropolyether or divalent perfluoroalkylene structure in the main chain thereof and having two or more hydrosilyl groups and addition-reactive alkenyl groups in the terminals or side chains thereof, and a polymer having two or more hydrosilyl groups in the molecule and being capable of addition reacting with the alkenyl groups, the fluorine-based elastomer being crosslinked with the polymer.

In a preferred embodiment, the plasma-resistant fluorine-based elastomer sealing material has a dielectric constant of 2.5 or less and a dielectric dissipation of 0.01 or less in a microwave band of from 1 GHz to 30 GHz.

DETAILED DESCRIPTION OF THE INVENTION

The present invention will be described in detail below.

The fluorine-based elastomer used in the fluorine-based elastomer sealing material of the present invention has a divalent perfluoropolyether or divalent perfluoroalkylene structure in a main chain thereof and has two or more hydrosilyl groups and addition-reactive alkenyl groups in the terminals or side chains thereof. Specifically, the fluorine-based elastomer is represented by the following formula (1):

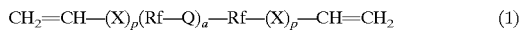  (1)

wherein Xs independently represent —$CH_2$—, —$CH_2O$—, —$CH_2OCH_2$—, —Y—$NR^1SO_2$— or —Y—$NR^1$—CO— (wherein Y represents —$CH_2$— or —$Si(CH_3)_2$—Ph—; and $R^1$ represents a hydrogen atom or a substituted or unsubstituted monovalent hydrocarbon group); Rf represents a divalent perfluoroalkylene group or a divalent perfluoropolyether group; p's independently represent 0 or 1; a represents an integer of 0 or more; and Q is represented by the following formula (2), (3) or (4):

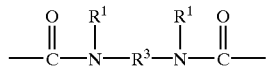  (2)

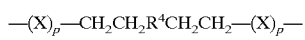  (3)

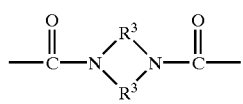  (4)

In the above formulae (2) to (4), X, p and $R^1$ have the same as defined in the formula (1) above; $R^3$ represents a substituted or unsubstituted divalent hydrocarbon group; and $R^4$ represents a substituted or unsubstituted divalent hydrocarbon group, in which one or two or more of an oxygen atom, a nitrogen atom, a silicon atom and a sulfur atom may be present in the way of the bond, or a functional group represented by the following formula (5) or (6):

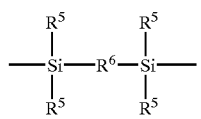  (5)

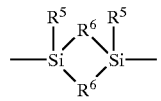  (6)

In the above formulae (5) and (6), $R^5$ represents a substituted or unsubstituted monovalent hydrocarbon group; and $R^6$ represents a group containing one or two or more atoms of a carbon atom, an oxygen atom, a nitrogen atom, a silicon atom and a sulfur atom in a main chain structure thereof.

Those polymers are commercially available; for example, trade names, "SIFEL" from Shin-Etsu Chemical Co., Ltd.

The above-described fluorine-based elastomer has two or more hydrosilyl groups in the molecule thereof, and is crosslinked with a polymer addition-reactive with an alkenyl group. Examples of the crosslinking polymer include organohydrogenpolysiloxanes having 2 or more, and preferably 3 or more, hydrosilyl groups. The organohydrogenpolysiloxanes that can be used are organohydrogenpolysiloxanes that are usually used in addition reaction-curable silicone rubber compositions. Particularly, compounds represented by the following formulae (7) and (8) are preferably used.

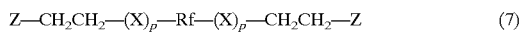  (7)

  (8)

In the above formulae (7) and (8), X, p and Rf have the same as defined in the formula (1) above; and Z is represented by the following general formula (9) or (10):

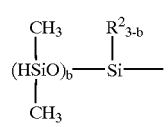  (9)

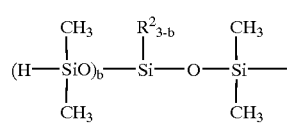  (10)

In the above formulae (9) and (10), $R^2$ is a substituted or unsubstituted monovalent hydrocarbon group: and b is 1, 2 or 3 in the compound represented by the formula (7) and 2 or 3 in the compound represented by the formula (8).

$R^2$ is preferably the monovalent hydrocarbon group having from 1 to 8 carbon atoms. Examples of the monovalent hydrocarbon group include an alkyl groups such as methyl, ethyl, propyl, isopropyl, butyl, isobutyl, tert-butyl, pentyl, neopentyl, hexyl, heptyl or octyl; a cycloalkyl group such as cyclopentyl, cyclohexyl or cycloheptyl; an aryl group such as phenyl, tolyl or xylyl; an aralkyl group such as benzyl or phenylethyl; and groups in which a part or all of the hydrogen atoms in the above groups are substituted with a halogen atom (such as fluorine, chlorine or bromine), such as chloromethyl group, bromoethyl group, chloropropyl group, trifluoropropyl group and 3,3,4,4,5,5,6,6,6-nonafluorohexyl group. Those crosslinking polymers are also commercially available; for example, a trade name, "Crosslinking Agent CP-2 for SIFEL" from Shin-Etsu Chemical Co., Ltd.

The crosslinking polymer is added in an amount sufficient for curing the fluorine-based elastomer, and the amount thereof is preferably from 0.5 to 5 parts by weight, and more preferably from 1 to 3 parts by weight, per 100 parts by weight of the fluorine-based elastomer.

Preferably, an addition reaction catalyst such as platinum group metal compounds is compounded with the crosslinking polymer. The platinum group metal compound generally used is platinum compounds. Examples of the platinum compounds include chloroplatinic acid or complexes of chloroplatinic acid with an olefin (such as ethylene), an alcohol or vinylsiloxane, and platinum/silica or alumina or carbon. However, the platinum compound is not limited to those compounds. Rhodium-, ruthenium-, iridium- and palladium-based compounds are also known as platinum group compounds other than the platinum compounds. Amount of the catalyst used is not particularly limited, and a desired curing rate can be obtained in a catalytic amount. However, the amount of the catalyst is preferably in the range of from about 0.1 to 1,000 ppm (calculated as a platinum group metal), and more preferably from about 0.1 to 500 ppm, based on the sum of the fluorine-based elastomer and the crosslinking polymer, from the economical standpoint or for the purpose of obtaining a good cured product.

The fluorine-based elastomer can also contain a reinforcing filler. Examples of the reinforcing filler include fumed silica, colloidal silica, diatomaceous earth, quartz powder, glass fibers, carbon black, metal oxides (such as iron oxide, titanium oxide or cerium oxide), and metal carbonates (such as calcium carbonate or magnesium carbonate). Those reinforcing fillers may be treated with various surface-treating agents. Amount of the reinforcing filler added is suitably from 1 to 100 parts by weight per 100 parts by weight of the fluorine-based elastomer.

The plasma-resistant fluorine-based elastomer sealing material according to the present invention can be produced in the conventional method. The fluorine-based elastomer raw material is a liquid type (paste type) or a solid type (millable type). In the case of the liquid type, the fluorine-based elastomer raw material is mixed with the crosslinking polymer and the like in a liquid-mixing machine or by stirring at a beaker level, and the composition obtained can be molded into a desired form by LIMS (Liquid Injection Molding System) molding or FIPG (Form In Place Gasket) process. On the other hand, in the case of the solid type, conventional production processes of rubber products can be applied. Specifically, the fluorine-based elastomer raw material is kneaded together with the crosslinking polymer and the like by, for example, open rolls, a pressure kneader or a Banbury mixer, and the composition obtained can be molded into a desired form by various methods such as heat press molding using a mold, extrusion molding, blow molding, transfer molding or injection molding.

As the molding conditions, primary curing is preferably conducted at from 100 to 200° C. for from 1 to 30 minutes. When the curing temperature is lower than 100° C., the curing time prolongs, resulting in poor industrial productivity, which is not preferable. On the other hand, when the curing temperature exceeds 200° C., scorch may occurs, which is not preferable. The curing temperature is more preferably from 120 to 170° C. In that case, a period of time within which the crosslinking reaction is completed may appropriately be selected as the curing time.

In order to stabilize the physical properties of the sealing material obtained, it is desired to undergo secondary curing through a heat treatment at from 100 to 230° C. for from about 1 to 24 hours. When the temperature is lower than 100° C., the secondary curing does not exhibit sufficient effect, whereas when it exceeds 230° C., heat decomposition may occur, which are not preferable. More preferably, the secondary curing is conducted at from 150 to 200° C. for from 1 to 20 hours.

The thus obtained plasma-resistant fluorine-containing elastomer sealing material according to the present invention has a dielectric constant of 2.5 or less, and from 2.3 to 2.5 on the average, and a dielectric dissipation of 0.01 or less, and from 0.003 to 0.006 on the average, in a microwave band of from 1 GHz to 30 GHz.

The present invention will be described in more detail with reference to the following Examples and Comparative Examples, but it is should understood that the invention is not construed as being limited thereto.

Formulation and molding conditions in the Examples are shown in Table 1, and formulation and molding conditions in the Comparative Examples are shown in Table 2.

EXAMPLES 1 TO 3

Comparative Examples 2 to 4 and 6 to 10

A raw material rubber, a crosslinking polymer, a catalyst and a co-crosslinking agent were kneaded with open rolls to obtain a compound. The compound was then filled in a mold and subjected to primary curing at a predetermined temperature for a predetermined time by a heat press to obtain a molding. The molding was subjected to secondary curing at a predetermined temperature for a predetermined time using an oven.

EXAMPLES 4 AND 5

A two-pack type raw material rubber was stirred and mixed in a beaker to obtain a compound. The compound was then filled in a mold and subjected to primary curing at a predetermined temperature for a predetermined time by LIMS molding to obtain a molding. The molding was subjected to secondary curing at a predetermined temperature for a predetermined time using an oven.

Comparative Example 1

A crosslinking agent-containing compound was re-kneaded by open rolls. The resulting compound was then filled in a mold and subjected to primary curing at a predetermined temperature for a predetermined time by a heat press to obtain a molding. The molding was subjected to secondary curing at a predetermined temperature for a predetermined time using an oven.

Comparative Example 5

A raw material resin was set in a mold, heated to a melting temperature (240° C.) using a heat press, and then maintained under pressure for about 1 hour. The mold was taken out and cooled until the mold temperature became 120 ° C. or lower, followed by demolding to obtain a preliminary molding. The preliminary molding was then subjected to radiation crosslinking upon irradiation with γ-rays at a dose of 80 kGy in a nitrogen atmosphere to obtain a molding.

The moldings obtained in Examples 1 to 5 were calculated in terms of dielectric constant and dielectric dissipation in a microwave band of from 1 GHz to 30 GHz. As a result, the dielectric constant was in the range of from 2.3 to 2.5, and the dielectric dissipation was in the range of from 0.003 to 0.006. The low dielectric constant and dielectric dissipation of each of a fluorocarbon rubber, a perfluro elastomer and a silicone rubber, each of which has conventionally been a main current rubber in rubber O-rings, and EPDM for comparison are shown below. Any of the moldings of Examples 1 to 5 had dielectric constant and the dielectric dissipation slightly higher than those of EPDM, but those molding had dielectric constant and the dielectric dissipation lower than those of the rubbers for conventional rubber O-rings.

|  | Dielectric constant | Dielectric dissipation |
|---|---|---|
| Fluorocarbon rubber | 4.5 to 5.0 | 0.050 to 0.100 |
| Perfluoro elastomer | 2.4 to 2.6 | 0.010 to 0.015 |
| Silicone rubber | 3.0 to 3.5 | 0.005 to 0.015 |
| EPDM | 2.2 to 2.5 | 0.003 to 0.005 |

In the light of the above, the plasma-resistant fluorine-based elastomer sealing material according to the present invention has small dielectric constant and dielectric dissipation as compared with those of the conventional rubber materials. Due to this, the plasma-resistant fluorine-based elastomer sealing material according to the present invention shows small heat generation by microwave absorption, and has heat resistance comparable to that of the perfluoro elastomer. Therefore, the plasma-resistant fluorine-based elastomer sealing material is difficult to degrade. Thus, the plasma-resistant fluorine-based elastomer sealing material according to the present invention can suitably be used as a sealing material in a space where microwaves are present in apparatuses utilizing the microwaves.

The fluorine-based elastomers, crosslinking polymer and catalyst used in the Examples are as follows.

| Fluorine-based elastomer: | SIFEL5701, made by Shin-Etsu Chemical Co., Ltd. SIFEL5701N, made by Shin-Etsu Chemical Co., Ltd. SIFEL5800, made by Shin-Etsu Chemical Co., Ltd. SIFEL3701A & 3701B (two-pack type), made by Shin-Etsu Chemical Co., Ltd. SIFEL3510A & 3510B (two-pack type), made by Shin-Etsu Chemical Co., Ltd. |
|---|---|
| Crosslinking polymer: | CP-2, made by Shin-Etsu Chemical Co., Ltd. |
| Catalyst: | PLF-2, made by Shin-Etsu Chemical Co., Ltd. |

The fluorine-based elastomers, silicone-based elastomers, crosslinking agents and co-crosslinking agent are as follows.

| Fluorine-based elastomer: | DAI-EL Perfluoro GA-55, made by Daikin Industries, Ltd. Viton GLT, made by DuPont Dow Elastomer DAI-EL G912, mady by Daikin Industries, Ltd. Aflas 100H, made by Asahi Glass Co., Ltd. DAI-EL Thermoplastic T5, made by Daikin Industries, Ltd. |
|---|---|
| Silicone-based elastomer: | KE961-U, made by Shin-Etsu Chemical Co., Ltd. KE971-U, made by Shin-Etsu Chemical Co., Ltd. FE273-U, made by Shin-Etsu Chemical Co., Ltd. FE261-U, made by Shin-Etsu Chemical Co., Ltd. FE221-U, made by Shin-Etsu Chemical Co., Ltd. |
| Crosslinking agent: | Perhexa 25B, made by NOF Corporation C-8A (peroxide-based crosslinking agent), made by Shin-Etsu Chemical Co., Ltd. |
| Co-crosslinking agent: | TAIC, made by Nippon Kasei Chemical Col., Ltd. |

The evaluation method of the resistance to oxygen plasma is as follows.

| Oxygen gas flow rate: | 20 SCCM |
|---|---|
| Radio frequency: | 13.56 MHz |
| Output of radio frequency: | 150 W |
| Irradiation time: | 2 hours |
| Specimen: | O-ring (size: P26) |
| Evaluation method: | Weight loss (mg/cm$^2$) per unit surface area was measured. The results obtained are shown in Tables 1 and 2. |

The evaluation of the adhesion to quartz was made in the following manner.

The O-ring (P26) was sandwiched by quartz sheets and irradiated with plasma in an approximately 20%-compressed state under the same conditions as in the above-described evaluation method of the resistance to oxygen plasma. The adhesion of the O-ring to the quartz sheets was evaluated. The results obtained in the Examples are shown Table 1 and the results obtained in the Comparative Examples are shown in Table 2.

TABLE 1

|  |  | Example 1 | Example 2 | Example 3 | Example 4 | Example 5 |
|---|---|---|---|---|---|---|
| Formulation (phr) | SIFEL5701 | 100 |  |  |  |  |
|  | SIFEL5701N |  | 100 |  |  |  |
|  | SIFEL5800 |  |  | 100 |  |  |
|  | SIFEL3701A |  |  |  | 50 |  |
|  | SIFEL3701B |  |  |  |  | 50 |
|  | SIFEL3510A |  |  |  | 50 |  |
|  | SIFEL3510B |  |  |  |  | 50 |
|  | Crosslinking polymer, CP-2 | 1.8 | 1.8 | 1.8 |  |  |
|  | Catalyst, PLF-2 | 1.0 |  | 0.3 |  |  |
| Primary curing conditions (° C. × min.) |  | 150 × 10 | 150 × 10 | 150 × 10 | 150 × 10 | 150 × 10 |
| Secondary curing conditions (° C. × hr.) |  | 200 × 4 | 200 × 4 | 200 × 4 | 200 × 4 | 200 × 4 |
| Resistance to oxygen plasma, Weight loss (mg/cm$^2$) |  | 1.6 | 1.7 | 1.8 | 1.2 | 1.2 |
| Adhesion to quartz |  | No | No | No | No | No |

TABLE 2

| | | Com. Ex. 1 | Com. Ex.2 | Com. Ex.3 | Com. Ex.4 | Com. Ex.5 | Com. Ex.6 | Com. Ex.7 | Com. Ex.8 | Com. Ex.9 | Com. Ex.10 |
|---|---|---|---|---|---|---|---|---|---|---|---|
| Formulation (phr) | DAI-EL Perfluoro GA-55 | 100 | | | | | | | | | |
| | Viton GLT | | 100 | | | | | | | | |
| | DAI-EL G912 | | | 100 | | | | | | | |
| | Aflas 100H | | | | 100 | | | | | | |
| | DAI-EL Thermoplastic T530 | | | | | 100 | | | | | |
| | KE961-U | | | | | | 100 | | | | |
| | KE971-U | | | | | | | 100 | | | |
| | FE273-U | | | | | | | | 100 | | |
| | FE261-U | | | | | | | | | 100 | |
| | FE221-U | | | | | | | | | | 100 |
| | Crosslinking agent, Perhexa 25B | | 2 | 2 | 2 | | | | | | |
| | Crosslinking agent, C-8A | | | | | | 0.8 | 0.8 | 0.8 | 0.8 | 0/8 |
| | Co-crosslinking agent, TAIC | | 2 | 2 | 2 | | | | | | |
| Primary curing conditions (° C. × min.) | | 150 × 10 | 160 × 8 | 160 × 5 | 160 × 12 | Irradiation with γ-rays 80 kGy | 165 × 10 | 165 × 10 | 165 × 10 | 165 × 10 | 165 × 10 |
| Secondary curing conditions (° C. × hr.) | | 180 × 4 | 200 × 4 | 200 × 4 | 200 × 4 | | 200 × 4 | 200 × 4 | 200 × 4 | 200 × 4 | 200 × 4 |
| Resistance to oxygen plasma, Weight loss (mg/cm²) | | 4.3 | 16.5 | 20.1 | 7.8 | 17.8 | 0.8 | 0.7 | 1.2 | 1.1 | 1.2 |
| Adhesion to quartz | | No | No | No | No | No | Yes | Yes | Yes | Yes | Yes |

It is clear from Tables 1 and 2 that the O-ring in each of the Examples according to the present invention shows extremely low weight loss by irradiation with oxygen plasma, as compared with that of the fluorine-based elastomers-made O-rings of Comparative Examples 1 to 5, and has resistance to oxygen plasma comparable to that of the silicone-based elastomer-made O-rings of Comparative Examples 6 to 10. Further, the O-ring in each of the Examples according to the present invention is free from adhesion to quartz as in the silicone-based elastomer-made O-rings of Comparative Examples 6 to 10.

As described above, the fluorine-based elastomer sealing material according to the present invention shows extremely low weight loss by irradiation with oxygen plasma as compared with that of other fluorine-based elastomers, and has resistance to oxygen plasma comparable to silicone-based elastomers. In addition, the fluorine-based elastomer sealing material according to the present invention is free from adhesion to quartz. Accordingly, the fluorine-based elastomer sealing material according to the present invention has an excellent durability as a sealing material for apparatuses utilizing oxygen plasma, as compared with the silicone-based elastomers. Moreover, the fluorine-based elastomer sealing material according to the present invention shows small heat generation by microwaves. Thus, the fluorine-based elastomer sealing material according to the present invention can suitably be used as a sealing material for plasma processing apparatus such as diode parallel plate plasma apparatus or microwave exciting high-density plasma apparatus.

It should further be apparent to those skilled in the art that various changes in form and detail of the invention as shown and described above may be made. It is intended that such changes be included within the spirit and scope of the claims appended hereto.

This application is based on Japanese Patent Application No. 2001-315321 filed Oct. 12, 2001 and Japanese Patent Application No. 2002-095254 filed Mar. 29, 2002, the disclosures of which are incorporated herein by reference in their entireties.

What is claimed is:

1. A plasma-resistant fluorine-based elastomer sealing material comprising a fluorine-based elastomer having a divalent perfluoropolyether or divalent perfluoroalkylene structure in the main chain thereof and having two or more hydrosilyl groups and addition-reactive alkenyl groups in the terminals or side chains thereof, and a polymer having two or more hydrosilyl groups in the molecule and being capable of addition reacting with the alkenyl groups, the fluorine-based elastomer being crosslinked with the polymer, wherein the sealing material has a dielectric constant of 2.5 or less and a dielectric dissipation of 0.01 or less in a microwave band of from 1 GHz to 30 GHz.

2. The plasma-resistant fluorine-based elastomer sealing material as claimed in claim 1, wherein the fluorine-based elastomer is represented by the following formula (1):

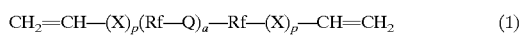

$$CH_2=CH-(X)_p(Rf-Q)_a-Rf-(X)_p-CH=CH_2 \quad (1)$$

wherein Xs independently represent $-CH_2-$, $-CH_2O-$, $-CH_2OCH_2-$, $-Y-NR^1SO_2-$ or $-Y-NR^1-CO-$ (wherein Y represents $-CH_2-$ or $-Si(CH_3)_2-Ph-$; and $R^1$ represents a hydrogen atom or a substituted or unsubstituted monovalent hydrocarbon group); Rf represents a divalent perfluoroalkylene group or a divalent perfluoropolyether group; p's independently represent 0 or 1; a represents an integer of 0 or more; and Q is represented by the following formula (2), (3) or (4):

(2)

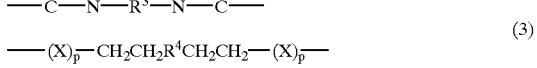

$$-(X)_p-CH_2CH_2R^4CH_2CH_2-(X)_p- \quad (3)$$

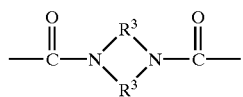
(4)

wherein X, p and $R^1$ have the same as defined in the formula (1) above; $R^3$ represents a substituted or unsubstituted divalent hydrocarbon group; and $R^4$ represents a substituted or unsubstituted divalent hydrocarbon group, in which one or two or more of an oxygen atom, a nitrogen atom, a silicon atom and a sulfur atom may be present in the way of the bond, or a functional group represented by the following formula (5) or (6):

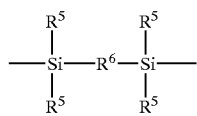
(5)

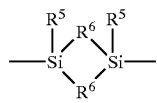
(6)

wherein $R^5$ represents a substituted or unsubstituted monovalent hydrocarbon group; and $R^6$ represents a group containing one or two or more atoms of a carbon atom, an oxygen atom, a nitrogen atom, a silicon atom and a sulfur atom in a main chain structure thereof.

3. The plasma-resistant fluorine-based elastomer sealing material as claimed in claim 1, wherein the crosslinking polymer include organohydrogenpolysiloxanes having 2 or more hydrosilyl groups.

* * * * *